Sept. 14, 1954  A. L. BUNTING  2,688,821
TOY VEHICLE WITH REMOTE CONTROL
Filed April 6, 1949  2 Sheets-Sheet 1

INVENTOR.
Albert L. Bunting
BY
Elmer Jamison Grey
ATTORNEY.

Sept. 14, 1954 A. L. BUNTING 2,688,821
TOY VEHICLE WITH REMOTE CONTROL
Filed April 6, 1949 2 Sheets-Sheet 2
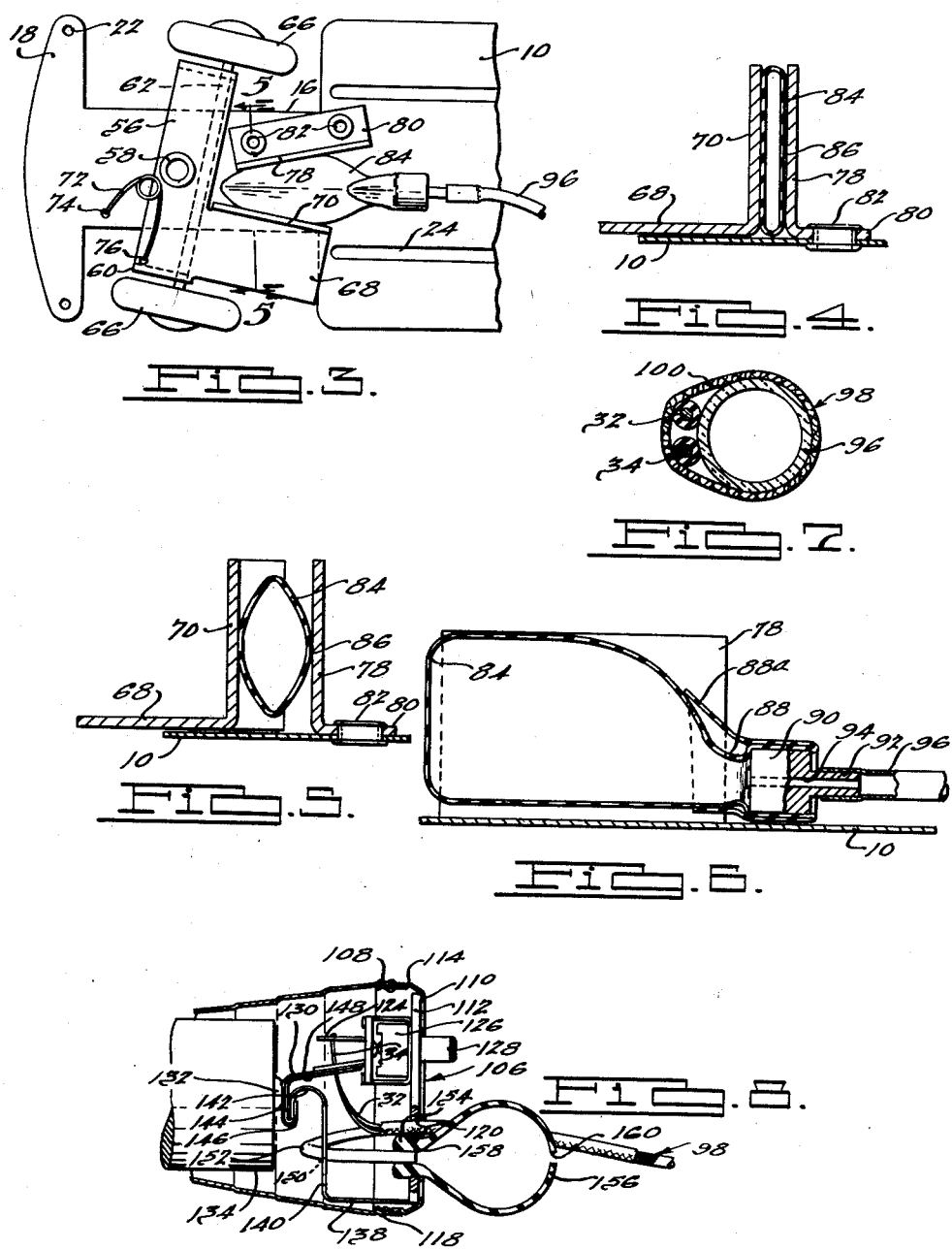
INVENTOR.
Albert L. Bunting Patented Sept. 14, 1954

2,688,821

UNITED STATES PATENT OFFICE 2,688,821

TOY VEHICLE WITH REMOTE CONTROL

Albert L. Bunting, Inkster, Mich.

Application April 6, 1949, Serial No. 85,829

8 Claims. (Cl. 46—210)

1

The present invention relates to improvements in remote control mechanisms and in particular to an improved vehicular construction, as for example a toy vehicle of the type which is remotely controlled by means of a flexible cable extending from the vehicle to a control device carried by the operator.

An object of the present invention is to provide an improved remotely controlled vehicle which is propelled by an electric motor and steered by fluid actuated means, such as pneumatic means for example.

Another object is to provide an improved remote control means which is particularly but not exclusively adapted for use with a toy vehicle of the foregoing character wherein a remote control device carried by the operator is connected with the vehicle by a flexible cable and comprises manually controlled means for supplying both electric energy to the motor and pressurized fluid to the fluid actuated steering means. It will be apparent from the following that application of the remote control means disclosed herein is not limited to use with vehicles or toys and may be readily employed with other apparatus where dual control by electric and fluid actuated means of the class involved is required or feasible.

Other objects of the present invention are to provide an improved flexible cable for a remote control means; and in particular to provide such a cable comprising by way of example a flexible tubular conduit for pressurized fluid and a plurality of flexible electric conductors insulated from each other, the conduit and conductors being enclosed in a flexible sheath, as for example of braided material.

Another object is to provide an improved simplified, highly responsive, and readily actuated steering mechanism for a toy vehicle, which is particularly adapted for operation by remote control means.

Other objects are to provide such a steering mechanism including means for continuously yieldingly urging the mechanism to a biased position for steering in one direction combined with improved, simplified remote control means for moving the steering mechanism from the biased position for steering in the other direction, whereby bi-directional steering is readily achieved by a uni-directional manually actuated control; and to provide cooperable steering and remote control means of the foregoing character which are particularly adapted for operation through a fluid medium.

Other objects are to provide an improved means

2 for mounting a wagon type steering mechanism on a vehicle frame to facilitate adjustment or repairs to the assembled mounting and to achieve a superior steering action and responsiveness to steering control which is particularly desirable in remotely controlled toy vehicles, while retaining the advantages and simplicity of construction and actuation permitted by such steering mechanism; and specifically to provide an improved steering mechanism which combines wagon type and caster type steering actions with a fluid actuated remote control means therefor.

Other objects are to provide a fluid actuated remote control steering mechanism for a toy vehicle which is operated by the expansion and contraction of a bulbous fluid container; and to provide an improved manner of attaching such a container to the steering mechanism so as to minimize interference with the aforementioned expansion and contraction.

In fluid actuated remote control means, difficulty is frequently encountered in preventing leakage of fluid from the system. Particularly in pneumatically actuated steering mechanisms, slow leakage of air from the system during operation gradually renders the same unresponsive to the control means. Prior to the present invention, refinements and precision in construction have been attempted to overcome such leakage. However the cost of the refinements has generally prohibted their use in low cost remote control mechanisms for toys or other devices.

Accordingly other objects of the present invention are to provide an improved pneumatically actuated remote control means having an air inlet opening to the atmosphere, whereby air lost from the system is readily replaced when the latter is not subjected to operative pressure, the opening being readily closed when the system is subjected to operating pressure; and to provide a manually controlled, pneumatically operated remote control means of the foregoing type which is particularly but not exclusively adapted for use with toy vehicles, wherein the air inlet opening is capable of being readily closed manually when the system is subjected to operating pressure.

Other objects are to provide a wheeled toy vehicle having a ground engaging drive wheel and an improved simplified drive mechanism including a rotatable pulley or driving means in direct frictional rolling engagement with the drive wheel for rotation thereof; and in particular to provide such a construction wherein a portion of the weight of the vehicle is supported by the rotatable driving means, which in turn is adapted to rest on the drive wheel so that the frictional driving engagement is assured by the weight of the vehicle.

Still another object is to provide a drive mechanism of the foregoing character having an improved mounting for the drive wheels whereby the latter are freely movable vertically with respect to the vehicle so as to maintain the gravity induced frictional driving engagement between the wheels and driving mechanism regardless of ordinary wear between these parts or dimensional variations resulting from loosely controlled production standards.

Other objects of this invention will appear in the following description and appended claims, reference being had to the accompanying drawings forming a part of this specification wherein like reference characters designate corresponding parts in the several views.

The above and other objects are accomplished in a preferred embodiment of the present invention comprising a wheeled vehicle, such as a toy automobile by way of example, having a body and a suitable motor or propelling means mounted thereon. The motor is preferably a small reversible electric motor because of its economy and availability for low priced toys and is conveniently adapted for remote control operation by means of flexible electric conductors operatively connected between the motor and a remote control device carried by the operator.

The motor is operatively coupled with rotatable driving means having wheel engaging portions in frictional rolling contact with ground engaging drive wheels for rotation of the latter. In a simplified construction, the driving means are mounted on the vehicle body for moving linearly therewith and are adapted to support the weight of the body and motor. The driving means in turn are adapted to rest on the upper rims of the drive wheels, whereby the weight of the body and motor assures suitable frictional driving engagement between the wheels and driving means.

Steering of the vehicle is accomplished by dirigible ground engaging wheels mounted on the body and operated by relatively movable steering members also carried by the body. As will be apparent below, many of the advantages of the present invention may be feasibly achieved with various suitable mechanically or electrically operated remote control means for actuating the steering mechanism. However it is within the scope of the present invention to provide a steering mechanism which is particularly adapted for efficient operation by means of a simple, economical fluid actuated remote control system.

The latter includes in a preferred embodiment a bladder or expansible bulbous container preferably of elastic material connected by a flexible conduit with a fluid pressure exerting means included in the control device carried by the operator. The bladder or container is suitably engaged with the relatively movable steering members for operation thereof and is selectively expanded to a bulbous shape or contracted in response to the supply of fluid thereto under the control of the operator.

It is apparent that upon expansion of the bladder or bulbous container by fluid pressure, its elastic walls will tend to stretch or expand to a generally rounded contour. In this connection it is important that comparative freedom of movement and stretching of the bladder sidewalls should be permitted at the regions of engagement thereof with the relatively movable steering members. Otherwise the bladder cannot expand freely and fully and operation of the steering mechanism is inhibited. It has thus been in accordance with the present invention to arrange the bladder so that the portions thereof engaged with the movable steering members are attached to the latter substantially along the comparatively localized regions which would ordinarily be tangent to the rounded contour of the expanded bladder even if the latter were not attached to the members. Thus a minimum of interference is offered to expansion of the elastic bladder sidewalls.

Although various aspects of the present invention are not dependent upon a particular steering construction, a steering mechanism which is especially useful in combination with the fluid actuated expansible bladder combines a wagon type and a caster type steering movement. In this construction a transverse steering arm having lateral ground engaging wheels rotatably mounted at its ends is mounted on the body for pivotal steering movement about a vertical axis located forward of the axis of rotation of the wheels. Thus the efficiency of the steering control and the responsiveness of the steering mechanism to expansion and contraction of the bladder or bulbous container is increased and the economical simplified steering control afforded by the latter is made particularly feasible.

In order to achieve another simplification in the steering control, the steering arm is yieldingly held in a biased steering position, as for example by resilient biasing means. In this situation, the expansible bladder or other fluid actuating mechanism is operatively engaged with the steering means to move the same by a steering movement in one direction from the biased position. Upon release of the fluid pressure, the biasing means will return the steering mechanism to the biased position by a steering movement in the other direction. Thus bi-directional steering movement is achieved with uni-directional manual control. It is apparent that the above outlined biased steering is particularly adapted for use with a fluid actuated remote control, since the efficiency and simplicity of operation and construction of the latter depends largely upon the delivery of a positive pressure, which by itself is conveniently adapted only for one way mechanical control without recourse to reversing valves or the like.

In the drawings:

Fig. 3 is a fragmentary plan view of the forward portion of the vehicle shown in Fig. 1, showing the steering mechanism in a different steering position.

Fig. 4 is an enlarged section through the fluid actuated bulb and relatively movable steering members, taken in the direction of the arrows along the line 4—4 of Fig. 1.

Fig. 5 is a view similar to Fig. 4, but taken in the direction of the arrows along the line 5—5 of Fig. 3.

Fig. 6 is a fragmentary enlarged section through the fluid actuated bulb, taken in the direction of the arrows along the line 6—6 of Fig. 1.

Fig. 7 is a fragmentary enlarged section through the flexible cable, taken in the direction of the arrows along the line 7—7 of Fig. 1.

Fig. 8 is a fragmentary section taken in the direction of the arrows along the line 8—8 of Fig. 1, showing details of the remote control device.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
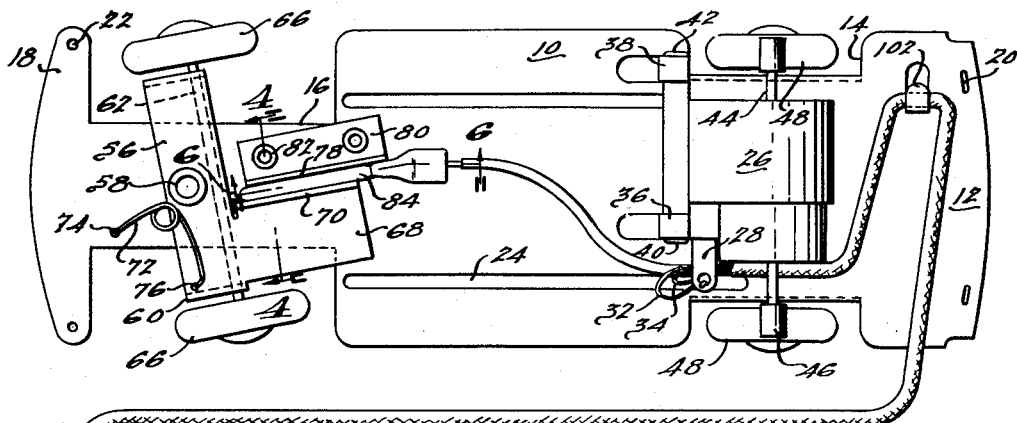
Fig. 1 is a fragmentary plan view of a vehicle and remote control means therefor constructed in accordance with the present invention, portions being broken away to show details of construction.
Figure 1:
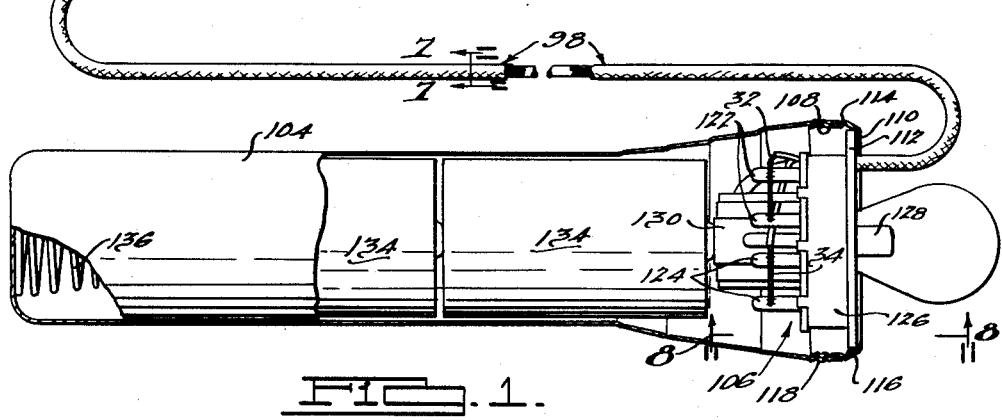

Referring to the drawings, an application of the present invention is shown by way of example with a toy automobile having a frame or chassis 10 preferably comprising a sheet metal stamping. As indicated in Fig. 1, the chassis or frame 10 is provided with a rear body supporting portion 12, paired lateral rear wheel recesses 14, paired lateral front wheel recesses 16, and a forward body supporting portion 18. Paired lateral screw holes 20 and 22 are provided in the body supporting portions 12 and 18 respectively to facilitate attachment of the body to the frame 10. Reinforcement of the frame 10 is effected by paired lateral reinforcing grooves 24 impressed into the central frame portions. The body or passenger compartment of the vehicle forms no part of the present invention and is accordingly not shown herein. Obviously the body may assume any desired shape, such as a sled, boat or airship, for example, or may simulate any desired animal.

Mounted on the frame 10 between the rear wheel recesses 14 is a motor housing 26 for a small reversible electric motor. The latter may be of conventional construction and is provided with a pair of electric terminals 28 and 30, Fig. 2, adapted respectively to be electrically connected with a pair of conductors 32 and 34 by which the motor is energized as described hereinafter. Any suitable means may be employed to fasten the housing 26 to the frame 10. In the present instance a pair of flaps or prongs 36 and 38 are stamped from the frame 10 and formed to overlie and wrap around a corresponding pair of lateral bosses 40 and 42 respectively of the housing 26, Fig. 2, whereby the latter is rigidly secured to the frame 10.

Extending concentrically through the axis of rotation of the rotor of the electric motor within the housing 26 and comprising an integral construction thereof for rotation therewith is a transverse drive shaft 44 having its ends projecting from the housing 26 and overlying the mid-regions of the recesses 14. On each of the opposed ends of the shaft 44 is a wheel engaging member or pulley 46, comprising in the present instance a short length of tubing of rubber or rubber-like material firmly secured concentrically to the shaft 44 for rotation therewith and for frictionally driving the vehicle rear wheels 48 as described hereinafter.

Figure 2:
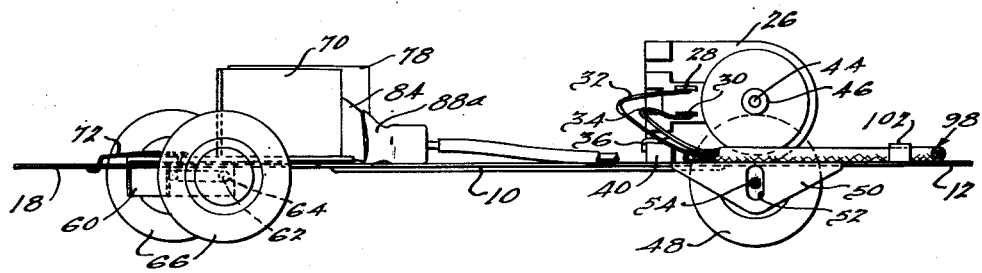
Fig. 2 is substantially a fragmentary side elevation of the vehicle shown in Fig. 1, the rear wheels being shown in phantom to illustrate details of their mounting.

As indicated in Fig. 2, flaps of sheet metal 50 integral with the frame 10 along the longitudinal inner edges of the recesses 14 extend vertically downward to comprise a pair of generally triangular wheel mountings. Directly under the shaft 44, a vertical axle receiving slot 52 is provided within each wheel mounting 50. Also underlying the drive shaft 44 is an axle shaft 54 having its opposed ends extending laterally through and journaled within the slots 52. Since the journal for the axle 54 at each end thereof is substantially the same on either side of the vehicle, the slot 52 in the mounting 50 on only one side is shown herein. Laterally of each mounting 50, one of the wheels 48 is suitably secured to the projecting end of the axle 54 for rotation therewith. The wheels 48 are preferably rubber tired and are dimensioned so that their upper portions underlie and support the wheel engaging pulleys or members 46, which in turn carry the weight of the rear portion of the vehicle suspended from the drive shaft 44.

Summarizing this construction, the weight of the frame 10 and vehicle body supported thereon is suspended from the housing 26 by virtue of the flaps 36, 38 which secure the frame 10 to the bosses 40, 42 of the housing 26. The latter contains the electric motor, the rotor of which is integral with the drive shaft 44, so that the weight of the motor, housing 26, and attached frame 10 depends from the shaft 44, which in turn is supported by its pulleys 46 resting on the wheels 48 in gravity induced frictional driving contact therewith.

The slots 52 are dimensioned to permit freedom of both rotational and vertical movement of the axle 54 therein and are located within their respective supports 50, so that when the wheels 48 rest on the ground, no portion of the frame 10 will rest on the axle 54. Thus a convenient clearance will exist between the latter and the upper and lower ends of the slots 52, Fig. 2. The axle 54 will float freely within the slots 52 and assure the frictional driving contact between the pulleys 46 and wheels 48 regardless of ordinary wear therebetween or variations in the radial dimensions of the driving parts, such as out-of-round wheels 48 or pulleys 46 for example, resulting from imperfect production standards.

Steering of the vehicle in the present instance is accomplished by means of a dirigible arm 56, which may be a sheet metal stamping, pivotally mounted at 58 on the frame 10 along the midline thereof between the forward wheel recesses 16 for turning about a vertical axis. The opposed ends of the arm 56 extend laterally into the recesses 16 and bend vertically downward to comprise a pair of parallel wheel mountings 60 spaced by the arm 56. Rearwardly of the pivot 58 and below the frame 10, a front axle 62 underlies the arm 56 and extends perpendicularly through opposed journal openings 64 in the mountings 60, Fig. 2. Laterally of the mountings 60, the opposed ends of the axle 62 are suitably secured to front wheels 66 for rotation therewith.

Inasmuch as the axle 62 does not directly underlie the pivot 58, the latter is readily accessible for subsequent adjustments or repairs after assembly of the steering mechanism. For example the pivot 58, which may be a conventional rivet, will occasionally be assembled too tightly to permit freedom of steering movement between the arm 56 and frame 10, or occasionally as a result of wear and use becomes too loose for efficient operation. It is apparent that by virtue of the present construction, the pivot element 58 may be readily removed and adjusted for tightness or looseness as required.

It is to be observed further that the present steering construction combines a wagon type and caster type steering action which is particularly desirable in remotely controlled toys of the class involved and affords increased sensitivity and responsiveness to steering control. Thus when the vehicle is in forward motion, the dirigible wheels 66 will tend to straighten or move to a neutral steering position for guiding the vehicle straight ahead in the direction of its longitudinal axis. The more the arm 56 is pivoted for steering angularly to the longitudinal axis of the vehicle, the greater will be the force exerted between the ground and wheels tending to return the latter to the neutral position. Accordingly when the arm 56 pivotally approaches the limit of steering movement in either direction, the force exerted by the ground in the wheels 66 tending to return the latter to the neutral position will be increasingly effective to accelerate steering movement toward the neutral position. On the other hand, when the wheels are in the neutral position, the steering effect of any slight pivotal movement of the arm 56 from the neutral position will be magnified by virtue of the forward off-set position of the pivot 58 with respect to the axle 62.

As a resultant of these actions, regardless of the means employed to actuate the arm 56, rapid turning of the vehicle in either direction is achieved when the wheels 66 are near the neutral position. Pivotal movement of the arm 56 is opposed as it approaches the steering limit in either direction, and is accelerated as it returns to the neutral position from the steering limits. This type of steering action is particularly desirable with remote control toys, since in ordinary operation most steering is accomplished at or near the neutral position. The principal steering problem is to maintain the vehicle in substantially a straight line, so that a continuously acting force tending to straighten the wheels is desirable. Likewise, when a sharp turn is made, a rapid return to the neutral position is also usually desired. It will be observed however that various aspects and advantages of the present invention are independent of the preferred type of steering shown.

Integral with the arm 56 and extending horizontally rearward from the left end thereof is an arm 68 having an upright portion or plate 70 perpendicular to the arm 56, Fig. 1. The arm 68 is resiliently held in a biased position by means of a torsion spring 72 having its extremities secured within retaining holes 74 and 76 within the frame 10 and steering arm 56 respectively for turning the vehicle to the left. Thus in the biased position, the plate 70 extends obliquely with respect to the longitudinal axis of the frame 10. Parallel to the plate 70 in the biased position is a fixed upright plate 78 having a horizontal footing 80 rigidly secured to the frame 10 by a plurality of rivets 82.

Referring particularly to Figs. 4, 5 and 6, an expansible generally elongated bulbous air container or bladder 84, preferably of rubber or similar elastic material, is shown interposed between the plates 70 and 78 with one side cemented to the plate 78 along a comparatively thin longitudinal mid-line seam 86. In the present instance, the bulb 84 is comparatively flat in the collapsed condition, Fig. 4, and enlarges to a rounded contour upon being inflated, Fig. 5, as described hereinafter. However, the specific shape is not controlling and various other economically produced shapes may be satisfactorily employed within the scope of the invention.

The bulb 84 converges rearwardly to a tubular stem or neck 88 within which is tightly fitted an adapter 90 of suitable rigid material having a reduced extension 92 and a central core 94. The rearward extremity 88a of the neck 88 is flared to facilitate insertion of the larger portion of the adapter 90 into the reduced portion of the neck 88, which then snugly grips the adapter 90 to complete a substantially air-tight seal therewith. The binding engagement between the neck 88 and the adapter 90 may be reinforced as shown by folding the flared neck portion 88a forward over the adapter 90, thereby doubling the neck 88 on itself. The reduced end 92 of the adapter 90 is secured to one end of a flexible tubular conduit 96 which leads to a remote control means for inflating the bulb 84 and operating the steering mechanism as described hereinafter.

As indicated in Figs. 1 and 7, remote control actuation of the bulb 84 and electric motor within the housing 26 is effected by means of a flexible remote control cable indicated generally by the numeral 98. The latter consists of the conduit 96 and conductors 32 and 34 insulated from each other and enclosed side by side within a braided sheath 100 of suitable material, such as cotton for example, to complete a compact, lightweight, and conveniently manipulated remote control cable which may be eight or ten feet or more in length as desired. The conductors 32, 34 may be of any conventional lightweight flexible construction. A preferred conduit 96 is formed of an extruded flexible vinyl-type plastic having a hardness of approximately eighty to approximately eighty-five durometer and an inside diameter of not less than .02 of an inch, being preferably in the neighborhood of .075 of an inch.

The vehicle end of the cable 98 is secured to the vehicle by means of a clip 102 suitably stamped from the frame portion 12 and clamped around the cable 98. From the clip 102, the cable 98 extends forward to the motor within the housing 26 whereat the sheath 100 is broken to expose the conductors 32 and 34 and permit their attachment as aforesaid to the motor terminals 28 and 30. The exposed conduit portion 96 continues to its attachment with the adapter extension 92.

The cable 98 extends in the other direction from the clip 102 to the remote control device comprising in the present instance a generally tubular cannister or housing 104 closed at one end and enlarged at the other end which is open to receive a control head indicated generally by 106. The cannister 104 may have the general construction of a conventional flashlight housing, with the exception that its closed base is not detachable and a sidewall switch is not provided therein.

The switch head 106 comprises an outer cylindrical rim 108, comparable to the conventional lens holding rim of a flashlight, having a screw threaded portion at one end, an annular inturned flange 110 at the other end, and an annular outward projecting shoulder 114 intermediate the flange 110 and screw threaded portion. A circular disc or plate 112 of any suitable rigid material such as sheet metal for example is pressed into the rim 108 against the flange 110 to occupy the position ordinarily taken by the lens in a flashlight construction. The disc 112 is suitably held in place within the rim 108, as for example by a plurality of resilient prongs 116 of the disc 112 projecting radially outward and angularly toward the interior of the shoulder 114 to engage the same and prevent displacement of the disc 112 from the flange 110. Permanent attachment between the disc 112 and rim flange 110 may be effected by spot welding if desired. The enlarged open end of the cannister 104 is screw threaded at 118 for detachably receiving the screw threaded rim 108, which screws into the open end of the cannister 104 until the latter abuts the annular shoulder 114, Fig. 1.

The end of the cable 98 leading to the remote control device passes through an opening 120 provided therefor within the plate 112, whereupon the braided sheath 100 is broken to expose the conductors 32 and 34 and the conduit 96, Fig. 8. The exposed ends of the conductors 32 and 34 are electrically secured to two sets of paired terminals 122 and 124 respectively of a switch panel 126, which is also suitably secured to the inner face of the disc 112. The switch mechanism including the terminals 122, 124 and panel 126 comprises a three position current reversing switch operated by a slide lever 128 extending through an opening provided therefor within the disc 112. Since the switch may be of conventional construction, it is not shown and described in detail herein. Preferably, the lever 128 may be located at a neutral position whereat no energy will flow to the motor within the housing 26, or may be moved by a sliding movement parallel to the plane of the disc 112 either to a forward or to a reversed position, whereat the said motor is energized for propelling the vehicle forward or rearward respectively.

Electrical energy is supplied to the switch mechanism through a terminal 130 having an inner end centrally located within the cannister 104 to contact the central or carbon electrode 132 of the foremost of a pair of conventional dry cells 134. The other end of the terminal 130 is connected with the switch panel 126 and is electrically connected with the switch mechanism to complete the three-position current reversing switch, operative as described. The ground or return circuit is completed through the body of the cannister 104 and a coil spring 136 to the zinc electrode of the rearmost dry cell 134. As is apparent in Fig. 1, the spring 136 holds the dry cells 134 in electrical contact with each other and forward within the container 104 against the terminal 130.

Integral with the disc 112 and projecting perpendicularly inward therefrom is a bracket supporting arm 138 having a portion 140 extending generally parallel to the disc 112 and then curving inward and back on itself in a loop 142 terminating at 144 adjacent the surface of the terminal 130 opposite the battery terminal 132. The extremity 146 of the terminal 130 bends sharply around the bracket extremity 144 and clamps tightly thereto in a hairpin loop whereby a rugged reinforced switch structure is provided and undesirable bending of the terminal 130 under the pressure of the spring 136 is avoided. Of course a suitable insulating strip 148 is interposed between the terminal 130, 146 and the bracket portions 140, 142, 144.

The bracket portion 140 is also provided with an aperture 150 through which passes a rigid U-shaped tubular connector conduit 152 connected at one end to the exposed extremity of the flexible conduit 96 passing through the aperture 120 and connected at its other end to the thickened tubular neck 154 of a hollow compressible bulb 156 of rubber or rubber-like material. Thus direct continuous communication is afforded between the bulbs 84 and 156. By virtue of the rigid connector conduit 152, reinforced at its passage through the opening 150 of the bracket portion 140, a rugged connection is afforded between the conduit 96 and the bulb 156, play or movement of the elements within the switch head is minimized, and accidental kinking, cutting, or blockage of the communication between the conduit 96 and the bulb 156 is avoided.

As indicated in Fig. 8, the body of the bulb 156 lies adjacent the exterior face of the disc 112 and is normally held in a generally bulbous expanded shape by the elasticity of its sidewalls. The neck 154 passes through an opening 158 provided therefor in the disc 112 and gradually thickens toward its caudal end. Prior to assembly of the bulb 156 adjacent the disc 112, the diameter of the neck 154 is constricted sufficiently to permit its insertion through the hole 158. Thereafter, the appropriate end of the rigid tube 152 is inserted snugly into the bore of the neck 154 so as to prevent subsequent constriction of the latter and withdrawal thereof from the opening 158.

Where desired, the bulb 156, connector 152, tubular conduit 96, and the bulb 84 may comprise a closed fluid system, with the bulb 156 in the expanded condition being filled with a suitable fluid and the bulb 84 collapsed or flattened as indicated in Fig. 4. In this situation, it is apparent that upon compression of the bulb 156, fluid pressure will be transmitted through the conduit 96 to the bulb 84. The latter will then expand and move the plate 70 and integral arms 68 and 56 in a clockwise steering movement away from the biased position shown in Fig. 1. The extent of movement will of course be determined by the extent of compression or deformation of the bulb 156.

However as aforementioned, in the absence of expensive precision construction, the fluid of the system will frequently gradually escape, rendering the steering control inoperative. It has accordingly been an important feature of the present invention to actuate the bulb 84 pneumatically and to provide an air inlet opening 160 within the bulb 156, whereby air lost during operation of the mechanism will be readily replaced immediately upon release of the deforming pressure on the bulb 156. The hole 160 is conveniently located in the sidewall of the bulb 156 furthermost from the plate 112, in which position it will automatically be covered by the finger of the operator upon compression of the bulb 156 in a steering operation. Upon release of the deforming pressure on the bulb 156, the latter will resume its uncompressed shape Figs. 1 and 8, releasing the pressure within the bulb 84 and permitting replenishment of air to the system through the opening 160 in the event that air was lost during the preceding operation. Upon release of the pressure within the bulb 84, the latter will collapse to its normal flattened condition and the biasing spring 72 will return the steering mechanism counter-clockwise to the biased position.

It is believed that operation of the apparatus disclosed herein is evident from the foregoing. The operator merely holds the cannister 104 in one hand, with his thumb over the opening 160 in position for compression of the bulb 156. With the fingers of his other hand he may readily manipulate the three-position switch lever 128. With the switch 128 in the neutral position, no electric energy will be supplied to the motor within the housing 26 and the vehicle will remain at rest. Upon movement of the switch 128 to the forward position, the motor will be energized to drive the shaft 44 in the direction to impart forward rotation to the wheels 48. If the operator elects to leave the steering mechanism in the biased position, Fig. 1, the vehicle will steer to the left. Upon partially compressing the bulb 156, with the operator's thumb over the opening 160, the bulb 84 will be partially inflated so as to straighten the steering mechanism. By slightly increasing or decreasing the extent of compression of the bulb 156, the vehicle may be readily steered either to the left or to the right. Upon movement of the slide lever 128 to the reversing position, the direction of the motion of the vehicle will be reversed, but the steering control will be unaffected.

The deformable bulb 156 disclosed herein is frequently preferred because of its economy and simplicity of operation. Nevertheless other pressure exerting means, as for example a cylinder and piston mechanism, may be conveniently employed with the present invention if desired. In such an instance, a finger operated push button or lever will usually be employed to actuate the piston and inflate the bladder 84. An opening comparable to the inlet opening 160 will be provided within the push button and in communication with the pneumatic system to permit replenishment of air thereto when the system is not under pressure.

As may be observed particularly in Fig. 5, the bulb 84 tends to assume a rounded section as it is expanded. Accordingly in the expanded condition it will contact the relatively movable steering members or plates 70 and 78 at localized points of tangency. Furthermore, as the bulb 84 inflates, the elastic sidewalls thereof will stretch or move relative to the plates 70 and 78 except at the aforementioned points of tangent contact. In order to secure the bulb 84 positively to the fixed plate 78 without materially interfering with the complete expansion of the bulb 84, the latter is glued at 86 to the plate 78 as nearly as feasible only at the regions thereof which would normally be in tangent contact with the bulb 84 when the latter is fully inflated, even if the bulb 84 and plate 78 were not attached. Thus a minimum of interference to expansion of the bulb 84 is caused by the glue line or seam 86.

The pneumatically actuated means including the expansible bulb 84 is particularly desirable because of its simplicity and economy in both construction and operation. However the nature of its operation, wherein pivotal movement of the steering mechanism is dependent upon volumetric changes of the bulb 84, requires optimum efficiency and responsiveness of the steering mechanism to the steering control. It is accordingly to be observed that the combined wagon-type and caster-type steering mechanism as presently employed, including the steering arm 56 pivotally connected to the frame 10 at the pivot 58 located forward of the axle 62, is particularly adapted for use in combination with the expansible bulb 84 and materially increases the feasibility of such a fluid actuated steering means.

Although the present invention has been described herein by way of example in application with a toy or wheeled vehicle, it is apparent that various aspects of the invention are readily applicable for other uses where remote control mechanisms of the foregoing class are required. Likewise, the steering mechanism and remote control therefor may be readily adapted for use with various non-wheeled toy vehicles employing runners, fins, or rudders, for example for steering sleds, airships, boats and the like.

I claim:

1. In combination, a toy vehicle, an electric motor carried by the vehicle for propulsion thereof, fluid pressure actuated steering control means carried by the vehicle for steering thereof, remote control operating means for the vehicle comprising a portable battery housing having a hollow cylindrical lower hand grip portion adapted to house a plurality of electric dry cells in series, the housing enlarging at its upper end to comprise a switch housing portion above the hand grip portion, an end closure plate for the upper end of the switch housing portion and secured thereto transversely to the cylindrical axis of the hand grip portion, switch means mounted on the underside of said plate including an operative circuit adapted to be connected with said dry cells, a finger actuated operating lever for said switch means and extending upward therefrom through said plate, a hollow deformable bulb mounted adjacent the upper surface of the plate and having a reduced tubular neck portion extending through the plate, the bulb being deformable against said plate by finger pressure to exert fluid pressure through said neck and being adapted to resume its undeformed condition upon release of the finger pressure, and a flexible remote control cable extending between the remote control means and vehicle for operation of the latter comprising a fluid conduit connecting the neck of said bulb and said pressure actuated means and also comprising electric conductors connecting said switch means and motor.

2. In a remote control means for an automotive dirigible toy vehicle having an electric motor for propulsion thereof and fluid pressure actuated steering control means, a portable battery housing having a hollow cylindrical lower hand grip portion adapted to house a plurality of electric dry cells in series and also having an enlarged hollow upper end, an end closure plate for said upper end and secured thereto transversely to the cylindrical axis of the hand grip portion, means in an operative electric circuit adapted for connecting said dry cells within the housing with said motor to operate the latter comprising switch means mounted on the underside of said plate, a finger actuated operating lever for said switch means and extending upward therefrom through said plate, a hollow deformable bulb mounted adjacent the upper surface of the plate and having a reduced tubular neck portion extending through the plate, the bulb being deformable against said plate by finger pressure to exert fluid pressure through said neck and being adapted to resume its undeformed condition upon release of the finger pressure, and a flexible remote control cable comprising a fluid conduit connecting the neck of said bulb and said pressure actuated steering control means for actuation of the latter upon deformation of said bulb and also comprising electric conductors connecting said circuit and motor for operation of the latter upon actuation of said switch means, the conduit and conductors being enclosed within a common sheath.

3. In a remote control means for an automotive dirigible toy vehicle having an electric motor for propulsion thereof and fluid pressure actuated steering control means, a portable battery housing having a hollow cylindrical lower hand grip portion adapted to house a plurality of electric dry cells in series and to extend above the latter, an end closure plate for the upper end of said housing and secured thereto transversely to the cylindrical axis of the hand grip portion, means including an operative electric circuit adapted to be connected with said motor for selectively connecting the latter with said dry cells and also including switch means in said circuit and mounted on the underside of said plate, a finger actuated switch operating lever for said switch means and extending upward therefrom through said plate, a hollow deformable bulb mounted adjacent the upper side of the plate and having a reduced tubular neck portion extending through the plate, the bulb being deformable against said plate by finger pressure to exert fluid pressure through said neck and being adapted to resume its undeformed condition upon release of the finger pressure, and the neck being adapted to be connected with said pressure actuated steering control means for actuation thereof upon deformation of the bulb.

4. In a remote control means for an automotive dirigible toy vehicle having an electric motor for propulsion thereof and fluid pressure actuated steering control means, a portable battery housing having a hollow lower hand grip portion adapted to house a battery and to extend above the latter, an end closure plate for the upper end of said housing and secured thereto, means including an operative electric circuit adapted to be connected with said motor for selectively connecting the latter with a battery in said housing and also including switch means in said circuit and mounted on said plate, a finger actuated switch operating lever for said switch means, a hollow deformable bulb mounted adjacent the upper side of the plate and having a reduced tubular neck portion extending through the plate, the bulb being deformable against said plate by finger pressure to exert fluid pressure through said neck and being adapted to resume its undeformed condition upon release of the finger pressure, and the neck being adapted to be connected with said pressure actuated steering control means for actuation thereof upon deformation of the bulb.

5. In a remote control means for an automotive dirigible toy vehicle having an electric motor for propulsion thereof and fluid pressure actuated steering control means, a portable battery housing having a hollow lower hand grip portion adapted to house a battery and to extend above the latter, an end closure plate for the upper end of said housing and secured thereto, means including an operative electric circuit adapted to be connected with said motor for selectively connecting the latter with a battery in said housing and also including switch means in said circuit and mounted on said plate, a finger actuated switch operating lever for said switch means, a hollow deformable bulb mounted adjacent the upper side of the plane and having a reduced tubular neck portion extending through the plate, the bulb having an opening in its upper end adapted to be closed by finger pressure applied thereto and being deformable against said plate by said finger pressure to exert fluid pressure through said neck and being adapted to resume its undeformed condition upon release of the finger pressure, and the neck being adapted to be connected with said pressure actuated steering control means for actuation thereof upon deformation of the bulb.

6. In a remote control means for an automotive dirigible toy vehicle having an electric motor for propulsion thereof and fluid pressure actuated steering control means, a portable battery housing having a hollow lower hand grip portion adapted to house a battery and to extend above the latter, an end closure plate for the upper end of said housing and secured thereto, means including an operative electric circuit adapted to be connected with said motor for selectively connecting the latter with a battery in said housing and also including switch means in said circuit and mounted on said plate, a finger actuated switch operating lever for said switch means, deformable fluid pressure exerting means having a discharge outlet and mounted adjacent the outer side of said plate, the pressure exerting means being deformable against said plate by finger pressure to exert fluid pressure through said outlet and being adapted to resume its undeformed shape upon release of the finger pressure, and the outlet being adapted to be connected with said pressure actuated steering control means for exerting pressure thereat.

7. In a remote control means for an automotive dirigible toy vehicle having an electric motor for propulsion thereof and fluid pressure actuated steering control means, a portable battery housing having a hollow lower hand grip portion adapted to house a battery and to extend above the latter, an end closure plate for the upper end of said housing and secured thereto removably, means including an operative electric circuit adapted to be connected with said motor for selectively connecting the latter with a battery in said housing and also including switch means in said circuit and mounted on the underside of said plate, a finger actuated switch operating lever for said switch means, a hollow deformable bulb mounted adjacent the upper side of the plate and having a reduced tubular neck portion extending through the plate, the bulb being deformable against said plate by finger pressure to exert fluid pressure through said neck and being adapted to resume its undeformed condition upon release of the finger pressure, and the neck being adapted to be connected with said pressure actuated steering control means for actuation thereof upon deformation of the bulb.

8. In a remote control means for an automotive dirigible toy vehicle having an electric motor for propulsion thereof and fluid pressure actuated steering control means, a portable battery housing having a hollow lower hand grip portion adapted to house a battery and to extend above the latter, an end closure plate for the upper end of said housing and secured thereto, means including an operative electric circuit adapted to be connected with said motor for selectively connecting the latter with a battery in said housing and also including switch means in said circuit and mounted on said plate, a finger actuated switch operating lever for said switch means, a hollow deformable bulb mounted adjacent the upper side of the plate and having a reduced tubular neck portion extending downward snugly through an orifice in the plate, the bulb being deformable against said plate by finger pressure to exert fluid pressure through said neck and being adapted to resume its undeformed condition upon release of the finger pressure, a rigid tube having one end extending snugly into the tubular neck from the underside of the plate, thereby to hold the neck tightly against the sides of the orifice in the plate through which the neck passes, the other end of the tube being adapted to be connected with said pressure actuated steering control means for actuation thereof upon deformation of the bulb.

References Cited in the file of this patent

UNITED STATES PATENTS

| Number | Name | Date |
|---|---|---|
| 676,409 | Berger | June 18, 1901 |
| 919,540 | Clark | Apr. 27, 1909 |
| 964,294 | Miller | July 12, 1910 |
| 1,150,727 | Alexander | Aug. 17, 1915 |
| 1,587,083 | Neuzerling | June 1, 1926 |
| 1,780,487 | Jurgensen | Nov. 4, 1930 |
| 1,796,157 | Moore | Mar. 10, 1931 |
| 2,054,644 | Wulfert | Sept. 15, 1936 |
| 2,320,367 | Leathers | June 1, 1943 |
| 2,638,712 | Jackson | May 19, 1953 |

FOREIGN PATENTS

| Number | Country | Date |
|---|---|---|
| 376,701 | Italy | Nov. 23, 1939 |
| 529,284 | Great Britain | Nov. 18, 1940 |